(12) United States Patent
Cao et al.

(10) Patent No.: US 12,288,092 B2
(45) Date of Patent: Apr. 29, 2025

(54) TASK PROCESSING METHOD AND DEVICE

(71) Applicant: Lenovo (Beijing) Limited, Beijing (CN)

(72) Inventors: Zisheng Cao, Beijing (CN); Qigang Wang, Beijing (CN); Peng Wang, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 227 days.

(21) Appl. No.: 18/121,513

(22) Filed: Mar. 14, 2023

(65) Prior Publication Data
US 2024/0004700 A1  Jan. 4, 2024

(30) Foreign Application Priority Data

Jun. 30, 2022 (CN) .......................... 202210779016.1

(51) Int. Cl.
*G06F 9/48* (2006.01)

(52) U.S. Cl.
CPC .................................. *G06F 9/485* (2013.01)

(58) Field of Classification Search
None
See application file for complete search history.

(56) References Cited

U.S. PATENT DOCUMENTS

| | | | | |
|---|---|---|---|---|
| 9,491,112 B1* | 11/2016 | Patel | ................... | G06F 9/45558 |
| 11,947,992 B2* | 4/2024 | Tan | ........................ | G06F 12/121 |
| 2005/0114586 A1* | 5/2005 | Brice, Jr. | ............ | G06F 9/45537 |
| | | | | 711/1 |
| 2005/0120160 A1* | 6/2005 | Plouffe | ................... | G06F 9/505 |
| | | | | 711/1 |
| 2010/0214949 A1* | 8/2010 | Smith | ..................... | H04L 49/70 |
| | | | | 370/254 |
| 2014/0310709 A1* | 10/2014 | Nirantar | .................. | G06F 9/485 |
| | | | | 718/1 |
| 2017/0060609 A1* | 3/2017 | Cropper | ................ | G06F 16/285 |

* cited by examiner

*Primary Examiner* — Michael Sun
(74) *Attorney, Agent, or Firm* — ANOVA LAW GROUP, PLLC

(57) ABSTRACT

A task processing method including associating and controlling, by a processing unit, a first resource to perform a task processing operation through N virtual resource identifiers in response to a task processing instruction. N is the number of data processing resources required for the task processing operation. The first resource includes n data processing resources, and n is an integer greater than or equal to 1, n<N. The method further includes associating, by the processing unit, a second resource with N-n virtual resource identifiers when the second resource switches from a second state to a first state. The second resource includes at least one data processing resource in a cluster other than the first resource. The method further includes controlling, by the processing unit, the first resource and the second resource to continue to perform the task processing operation through the N virtual resource identifiers.

20 Claims, 4 Drawing Sheets

The processing unit associates and controls a first resource to perform a task processing operation through N virtual resource identifiers in response to a task processing instruction — 101

The processing unit associates the second resource with N-n virtual resource identifiers when a second resource is switched from a second state to the first state — 102

The processing unit controls the first resource and the second resource to continue to perform the task processing operation through the N virtual resource identifiers — 103

TASK PROCESSING METHOD AND DEVICE

CROSS-REFERENCES TO RELATED APPLICATION

This application claims priority to Chinese Patent Application No. 202210779016.1 filed on Jun. 30, 2022, the entire content of which is incorporated herein by reference.

FIELD OF TECHNOLOGY

The present disclosure relates to the field of data processing technology and, more specifically, to a task processing method and device.

BACKGROUND

During distributed task processing, task processing operations can only be performed when the number of idle data processing resources in the cluster is greater than or equal to the number of data processing resources required for task processing. This task processing approach is not flexible.

SUMMARY

One aspect of this disclosure provides a task processing method including associating and controlling, by a processing unit, a first resource to perform a task processing operation through N virtual resource identifiers in response to a task processing instruction. N is the number of data processing resources required for the task processing operation. The first resource includes n data processing resources, and n is an integer greater than or equal to 1, n<N. The method further includes associating, by the processing unit, a second resource with N-n virtual resource identifiers when the second resource switches from a second state to a first state. The second resource includes at least one data processing resource in a cluster other than the first resource. The method further includes controlling, by the processing unit, the first resource and the second resource to continue to perform the task processing operation through the N virtual resource identifiers.

Another aspect of this disclosure provides a task processing device including a processing unit. The processing unit is configured to control and associate a first resource to perform a corresponding task processing operation through N virtual resource identifiers in response to a task processing instruction. N is the number of data processing resources required for the task processing operation. The first resource includes n data processing resources, and n is an integer greater than or equal to 1, n<N. The processing unit is further configured to associate a second resource with N-n virtual resource identifiers when the second resource switches from a second state to a first state. The second resource includes at least one data processing resource in a cluster other than the first resource. The processing unit is further configured to control the first resource and the second resource to continue to perform the task processing operation through the N virtual resource identifiers.

Another aspect of this disclosure provides a non-transitory computer-readable storage medium containing computer-executable instructions that, when executed by a processor, cause the processor to control and associate a first resource to perform a corresponding task processing operation through N virtual resource identifiers in response to a task processing instruction. N is the number of data processing resources required for the task processing operation. The first resource includes n data processing resources, and n is an integer greater than or equal to 1, n<N. The instruction further causes the processor to associate a second resource with N-n virtual resource identifiers when the second resource switches from a second state to a first state. The second resource includes at least one data processing resource in a cluster other than the first resource. The instruction further causes the processor to control the first resource and the second resource to continue to perform the task processing operation through the N virtual resource identifiers.

DETAILED DESCRIPTION

Figure 1:
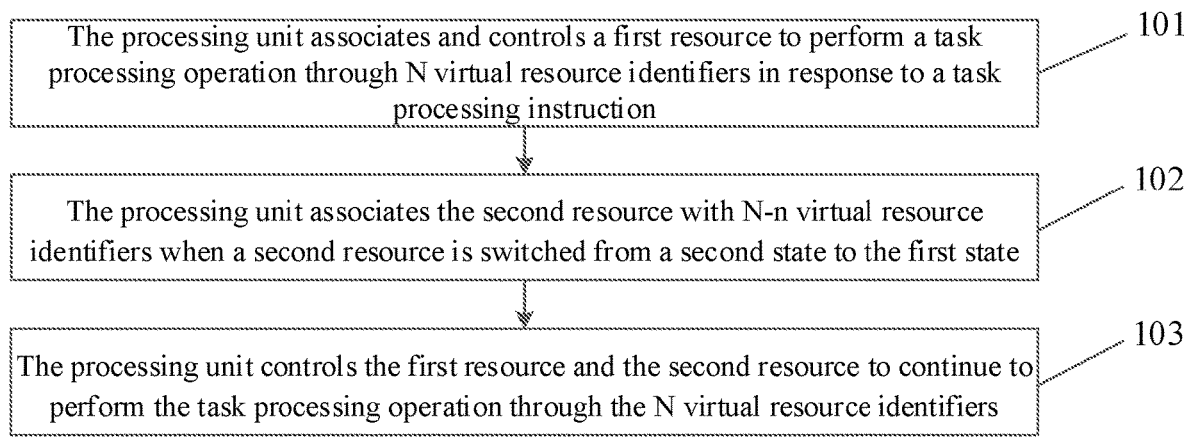
FIG. 1 is a flowchart of a task processing method according to an embodiment of the present disclosure.

Hereinafter, aspects, features, and embodiments of the present disclosure will be described with reference to the accompanying drawings. Such description is illustrative only but is not intended to limit the scope of the present disclosure. In addition, it will be understood by those skilled in the art that various modifications in form and details may be made therein without departing from the spirit and scope of the present disclosure.

The distributed task processing solution using cluster data processing resources has been widely used. For example, in the cluster model distributed training solution, each subtask of the distributed training is completed independently on the cluster devices, and the training gradients are combined after the training tasks of each device are completed, which can greatly improve the efficiency of model training.

However, in some embodiments, the distributed task processing process can only be started when the number of idle devices or resources in the cluster is greater than or equal to the number of devices or resources required by the distributed task processing process. Conversely, if the number of idle devices or resources in the cluster is less than the number of devices or resources required by the distributed task processing process, the distributed task processing process cannot be started, but can only continue to wait for idle devices or resources until the number of idle devices or resources can meet the need of the distributed task processing process.

In view of the foregoing, related technologies provide a technical solution for setting distributed tasks as pre-emptible tasks. That is, when the current distributed task is in a waiting state due to insufficient idle devices or resources in the cluster, if the number of idle devices or resources in the cluster is greater than or equal to the number of devices or resources required by other tasks after the current distributed task in the task queue, the execution of other distributed tasks can be started until the number of idle devices or resources in the cluster can meet the needs of the current distributed task. Subsequently, other distributed tasks can be suspended and the execution of the current distributed task can be started.

However, during the implementation of the technical solution described above, if the current distributed task requires a large number of devices or resources, the wait time for the current distributed task may be long, and the specific wait time cannot be determined. In addition, during the startup and suspension of other distributed tasks, the data processing resources of the cluster can easily be consumed. At the same time, during the execution of the technical solution described above, the execution of other distributed tasks must be carried out in the pre-emptible mode. Therefore, the technical solution described above cannot fundamentally improve the efficiency of distributed tasks.

In view of the foregoing, embodiments of the present disclosure provide a task processing method and device. In the task processing method provided by the embodiments of the present disclosure, when the available data processing resources in the cluster cannot fully meet the task processing requirements, the task processing operation can be performed based on the limited available data processing resource. When it is detected that any data processing resources in the cluster are switched to an available state, these data processing resources can be dynamically, flexibly, and in real-time associated with the task processing operation process, thereby realizing the dynamic and flexible processing of task processing operations.

It should be noted that the task processing method described above may be implemented by a processor of an electronic device. For example, the electronic device may include devices for starting, managing, and controlling task processing operations. For example, the processor may be at least one of an application specific integrated circuit (ASIC), a digital signal processor (DSP), a digital signal processing device (DSPD), a programmable logic device (PLD), a field programmable gate array (FPGA), a central processing unit (CPU), a controller, a microcontroller, and a microprocessor.

FIG. 1 is a flowchart of a task processing method according to an embodiment of the present disclosure. The method will be described in detail below.

101, in response to a task processing instruction, the processing unit associates and controls a first resource to perform a task processing operation through N virtual resource identifiers.

In some embodiments, N may be the number of task processing resources required for the task processing operation. The first resource may include n task processing resources in a first state in the cluster, n may be an integer greater than or equal to 1, and n may be less than N.

In some embodiments, the first state may include a state where at least some resources are available. For example, the first state may include an idle state.

In some embodiments, the task processing instructions may be sent by a host computer of the processing unit. For example, the task processing instructions may be input to the processing unit by users or professional technicians.

In some embodiments, the processing unit may be an electronic device having a communication connection with the cluster. In some embodiments, the processing unit may be a physical device or a virtual device. The processing unit may be a unit configured to realize the state control, such as start, execution, pause, restart, and stop of the task processing operation. In some embodiments, the processing unit may include a parameter server (PS) in a PS-Worker architecture.

In some embodiments, the N virtual resource identifiers may include N mutually independent virtual resource identifiers. In some embodiments, the virtual resource identifier may be set by the processing unit, such as a virtual Internet Protocol (IP) address and/or a port number.

In some embodiments, data processing resources may include resources capable of performing physical and/or virtual simulations of task processing functions. In some embodiments, when there are a plurality of data processing resources, the type of each data processing resource may be different or the same. For example, the first data processing resource may be a CPU, the second data processing resource may be a graphics processing unit (GPU), the third data processing resource may be a physical resource, and the fourth data processing resource may be a virtual simulation resource. In some embodiments, the plurality of data processing resources may be a plurality of GPUs.

In some embodiments, the cluster may include a plurality of data processing resources. For example, in the PS-Worker architecture, the cluster may be a PS working server. In some embodiments, the cluster may include any cluster that can implement distributed data processing functions, such as a Kubernetes cluster.

In some embodiments, a communication connection may be established between the cluster and the processing unit. After receiving the task processing instruction, the processing unit may issue the task processing instruction to the cluster through the communication connection. The cluster may distribute the task processing operation corresponding to the task processing instruction to at least one data processing resource, such that the at least one data processing resource can perform the task processing operation and return the task processing result.

In some embodiments, the task processing instruction may include the number of data processing resources required for the task processing operation, and may also include the type of data processing resources required for the task processing operation. For example, the task processing instruction may also include information such as the timing for starting the task processing operation, which is not limited in the embodiments of the present disclosure.

In some embodiments, the processing unit associating and controlling the first resource to perform the task processing operation through the N virtual resource identifiers may be implemented in the following manner.

In the first manner, the processing unit may associate the first resource with N virtual resource identifiers. After the association is successful, at least some of the first resources in the first resource may be controlled to perform task processing operations through the N virtual resource identifiers.

In the second manner, the processing unit may associate the first resource with the N virtual resource identifiers and analyze the task processing operation at the same time. Subsequently, the processing unit may determine a target subtask, and control the first resource to perform the target subtask through the N virtual resource identifiers.

102, when a second resource is switched from a second state to the first state, the processing unit associates the second resource with N-n virtual resource identifiers.

In some embodiments, the second resource may include at least one data processing resource in the cluster other than the first resource.

In some embodiments, if no data processing resource in the cluster is switched from the second state to the first state, the processing unit may not perform the operation of associating the second resource through the N virtual resource identifiers.

In some embodiments, the second state may include a state in which at least some data processing resources are unavailable. For example, the second state may include a data processing state, or the second state may include a state occupied by other task processing operations.

In some embodiments, the processing unit or the cluster may be configured to monitor the state of the data processing resources in the cluster, and determine at least one data processing resource as the second resource when it is detected that at least one data processing resource is switched to the first state.

In some embodiments, the processing unit associating the second resource with N-n virtual resource identifiers may be implemented in the following manners.

In the first manner, when the number of resources is less than N-n, the processing unit may obtain the number of resources, and associate the virtual resource identifier of the number of resources in the N-n virtual resource identifiers with the second resource.

In the second manner, when the number of resources equals N-n, the processing unit may associate the N-n virtual resource identifiers with the data processing resources in the second resource.

In the third manner, when the number of resources is greater than N-n, the processing unit may associate the N-n virtual resource identifiers with the N-n data processing resources in the second resource.

103, the processing unit controls the first resource and the second resource to continue to perform the task processing operation through the N virtual resource identifiers.

In some embodiments, the processing unit may add the second resource to the data processing resource set of the task processing operation.

In some embodiments, the processing unit may be configured to analyze the processing state of the task processing operation to obtain a plurality of subtasks, and then assign the plurality of to-be-processed subtasks by each data processing resource to the first resource and the second resource through the N virtual resource identifiers to continue to perform the task processing operation.

Consistent with the present disclosure, in response to a task processing instruction, when the number of data processing resources in the first state in the cluster is less than the number of data processing resources required by the task processing operation, the processing unit may associate and control n data processing resources in the first state in the cluster through N virtual resource identifiers to perform the task processing operation. In addition, when the second resource switches from the second state to the first state, the processing unit may associate the second resource with N-n virtual resource identifiers, and control the first resource and the second resource to continue to perform the task processing operation through the N virtual resource identifiers.

According to the embodiments of the task processing method provided in the present disclosure, when the number of data processing resources in the first state in the cluster is less than the number of data processing resources required by the task processing operation, the task processing operation can still be performed. In addition, when at least one data processing resource in the cluster switches to the first state, the available data processing resource may be dynamically and flexibly associated with the task processing operation to continue to perform the task processing operation. In this way, the task processing operation can be performed flexibly when the number of available data processing resources cannot meet the requirements of the task processing operation, and the dynamic addition of data processing resources during the task processing operation process is improved, thereby greatly improving the flexibility of task processing operation based on the cluster and improving the efficiency of the task processing operation.

In some embodiments, the task processing method provided by the embodiments of the present disclosure may further include: the processing unit creating N virtual resources based on the task processing instruction, and setting the virtual resource identifiers for the N virtual resources to obtain N virtual resource identifiers.

In some embodiments, after receiving the task processing instruction, the processing unit analyze the task processing instruction, obtain the number of data processing resources required for the task processing operation, and determine the number of virtual resources the processing unit needs to create based on the number of data processing resources required for the task processing operation.

In some embodiments, after the processing unit creates the N virtual resources, the processing unit may set a virtual resource identifier for each virtual resource, thereby obtaining the N virtual resource identifiers.

In some embodiments, the virtual resource may be a virtual object of the data processing resource required by the task processing operation crated by the processing unit. For example, the virtual resource may be a proxy object of the data processing resource on the side of the processing unit.

Consistent with the present disclosure, the processing unit may be configured to create N virtual resources based on the task processing instruction, and set virtual resource identifiers for the N virtual resources to obtain N virtual resource identifiers. Therefore, in the task processing method provided by the embodiments of the present disclosure, the processing unit can flexibly determine the number of created virtual resources based on the task processing instruction it receives, thereby laying a foundation for subsequent processing units to associate and control the data processing resources to perform the task processing operation through the virtual resource identifiers.

Based on the foregoing embodiments, the task processing method may further include: after the processing unit associates and controls the first resource to perform the task processing operation through the N virtual resource identifiers, adjusting the state of the first resource to the second state; and, after the processing unit controls the first resource and the second resource to continue to perform the task processing operation through the N virtual resource identifiers, adjusting the state of the second resource to the second state.

In some embodiments, the second state may include a state in which data processing resources are occupied by the task processing operation, or the second state may include a state in which data processing resources cannot be occupied by other task processing operations.

Consistent with the present disclosure, after the processing unit associates and controls the first resource and the second resource to perform the task processing operation, the state of the first resource and the second resource can be adjusted in real time to the second state, thereby reducing the risk of the first resource and the second resource being requested or occupied by other task processing operations, reducing the probability of conflict or mutual exclusion of different task processing operations in terms of data processing resources, and improving the stability and efficiency of task processing operations.

Figure 2:
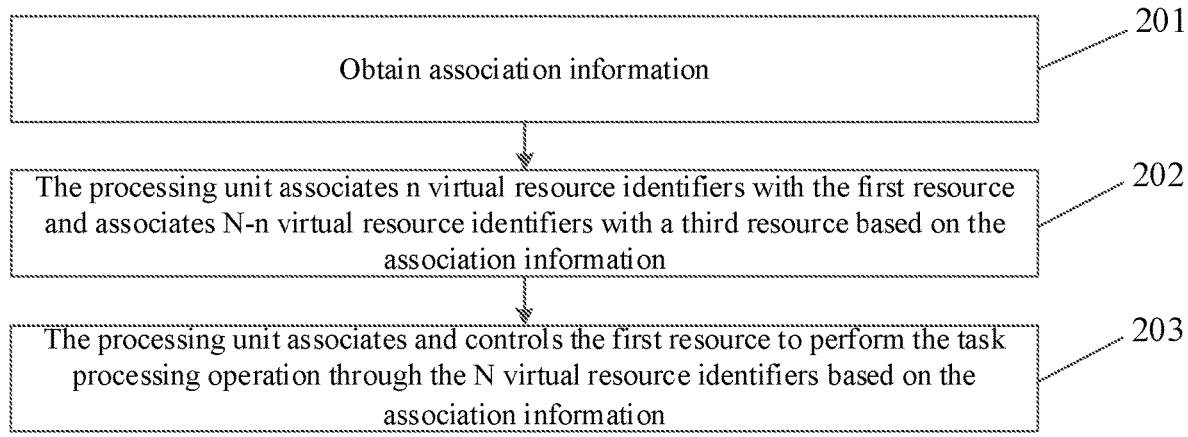
FIG. 2 is a flowchart of a processing unit associating and controlling a first resource to perform a task processing operation through N virtual resource identifiers according to an embodiment of the present disclosure.

Based on the foregoing embodiments, in the task processing method provided by the embodiments of the present disclosure, the processing unit associating and controlling the first resource to perform the task processing operation through the N virtual resource identifiers may be realized through the processes shown in FIG. 2. FIG. 2 is a flowchart of the processing unit associating and controlling the first resource to perform the task processing operation through the N virtual resource identifiers according to an embodiment of the present disclosure. The processes will be described in detail below.

201, obtain association information.

In some embodiments, the association information may include mapping information between the N virtual resource identifiers and the data processing resources.

In some embodiments, the association information may be stored in the storage space of the processing unit, or the association information may be obtained by the processing unit from other devices or other storage devices.

In some embodiments, the association information may include a one-to-one mapping relationship between N virtual resource identifiers and N data processing resources. Alternatively, the association information may include a many-to-one mapping relationship between N virtual resource identifiers and M data processing resources, M being a positive integer smaller than N.

202, the processing unit associates n virtual resource identifiers with the first resource and associates N-n virtual resource identifiers with a third resource based on the association information.

In some embodiments, the third resource may include any data processing resource in the first resource.

In some embodiments, the third resource may include a data processing resource of the first resource. In this case, the association information may include a one-to-one mapping relationship between the n virtual resource identifiers and data processing resources in the first resource, and the association information may include a many-to-one mapping relationship between N-n virtual resource identifies and the third resource.

In some embodiments, when n is greater than or equal to 2, the third resource may include at least two data processing resources in the first resource. In this case, the association information may include a one-to-one mapping relationship between the n virtual resource identifiers and data processing resources in the first resource, and the association information may include a many-to-one or one-to-one mapping relationship between N-n virtual resource identifies and the third resource.

203, the processing unit associates and controls the first resource to perform the task processing operation through the N virtual resource identifiers based on the association information.

In some embodiments, when the processing unit needs to start or perform a task processing operation, the processing unit may obtain the mapping relationship between the N virtual resource identifiers and each data processing resource in the first resource from the association information. Further, based on the mapping relationship, subtasks may be assigned to each data processing resource in the first resource through the n virtual resource identifiers to perform the task processing operation.

Consistent with the present disclosure, after the processing unit obtains the mapping information, that is, the association information, between the N virtual resource identifiers and data processing resources, the processing unit may associate the n virtual resource identifiers with the first resource and associated N-n virtual resource identifiers with the third resource based on the association information. Subsequently, based on the association information, the N virtual resource identifiers may be used to associate and control the first resource to perform the task processing operation.

Therefore, in the task processing method provided by the embodiments of the present disclosure, the processing unit can determine the association between the virtual resource identifiers and the data processing resources based on the association information, and can also associate and control the first resource to perform the task processing operation through the virtual resource identifiers, which not only realizes the isolation between the task processing operation and the processing unit, reduces the degree of coupling between the task processing operation and the processing unit, but also improves the flexibility of the processing unit to control the task processing operation.

Based on the foregoing embodiments, in the task processing method provided by the embodiments of the present disclosure, the association information may be obtained through the following processes.

A1, obtaining first address information and second address information.

In some embodiments, the first address information may include address information of the data processing resources, and the second address information may include the N virtual resource identifiers.

In some embodiments, the virtual resource identifiers may include address information of the virtual resources.

In some embodiments, the first address information may include the physical address information of the data processing resources. For example, the first address information may include the network address information of the data processing resources, such as the IP address of the data processing resources, or the port numbers of the data processing resources.

In some embodiments, the processing unit may obtain the first address information from the cluster. For example, the cluster may actively send the first address information to the processing unit. After the processing unit receives the task processing instruction and determines the number of data processing resources required for the task processing operation, the processing unit may send a request message for obtaining the first address information to the cluster. After receiving the request message, the cluster may send the first address information to the processing unit.

In some embodiments, after the processing unit creates the N virtual resources, the processing unit may set the IP addresses and port numbers for the N virtual resources, and establish a mapping relationship between the IP addresses and port numbers and the first address information.

A2, the processing unit obtains the association information based on the first address information and the second address information.

In some embodiments, the processing unit may determine how to determine the association information between the first address information and the second address information based on the first address information and the number of addresses in the second address information. For example, if the amount of first address information is less than the amount of the second address information, the association information may include a one-to-one mapping relationship between the first address information and the second address information, and a one-to-many mapping relationship between the first address information and the second address information. In another example, if the number of data processing resources in the first resource is smaller than the number of virtual resources, at this time, the association information may include a one-to-one mapping relationship between n data processing resources and n virtual resource identifiers, and a one-to-many mapping relationship between the data processing resources and N-n virtual resource identifiers.

In some embodiments, the virtual resource identifier may include the IP address and port number of the virtual resource. In this case, the virtual resource identifier may not only uniquely represent the virtual resource, but may also represent the address of the virtual resource, such that the association information can reflect the mapping relationship between the address of the virtual resource and the address of the data processing resource, thereby improving the efficiency of data interaction between the processing unit and the data processing resource through the virtual resource identifier.

Consistent with the present disclosure, after obtaining the address information of the data processing resources and the N virtual resource identifiers, the processing unit may obtain the association information between the above address information.

Therefore, in the task processing method provided by the embodiments of the present disclosure, the association information can be determined by the processing unit, which improves the flexibility of the association information and greatly improves the flexibility of the processing unit to associate the corresponding data processing resources for different task processing operations. In addition, the processing unit can determine the association information based on the address information of the data processing resources and the address information of the virtual resources, such that the association information is not only related to the actual task processing operations, but also related to the state and quantity of the data processing resources in the cluster, thereby improving the stability of the processing unit to perform the task processing operation through the virtual resource identifiers based on the association information.

Figure 3:
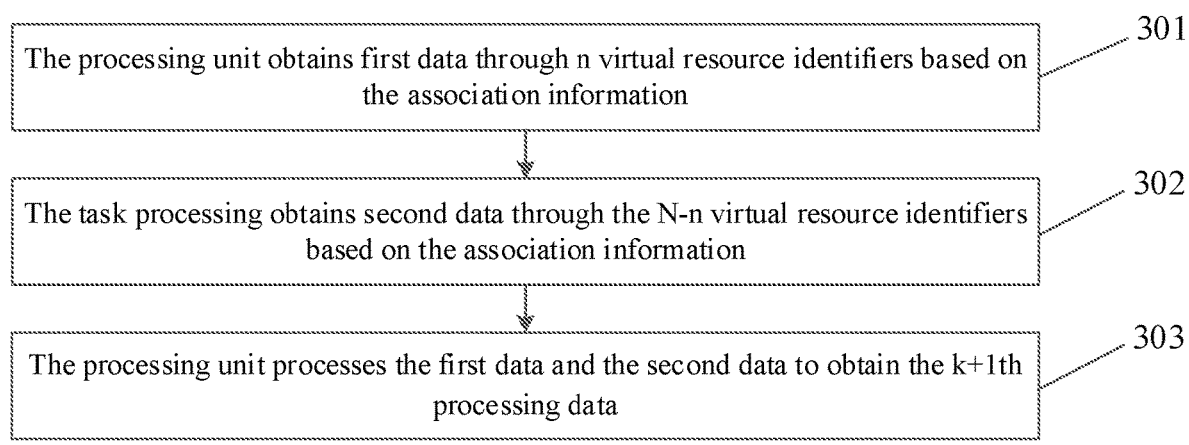
FIG. 3 is a flowchart of the processing unit associating and controlling the first resource to perform the task processing operation through the N virtual resource identifiers based on association information according to an embodiment of the present disclosure.

Based on the foregoing embodiments, in the task processing method provided by the embodiments of the present disclosure, the processing unit associating and controlling the first resource to perform the task processing operation through the N virtual resource identifiers based on the association information may be realized through the processes shown in FIG. 3. FIG. 3 is a flowchart of the processing unit associating and controlling the first resource to perform the task processing operation through the N virtual resource identifiers based on the association information according to an embodiment of the present disclosure. The processes will be described in detail below.

301, the processing unit obtains first data through n virtual resource identifiers based on the association information.

In some embodiments, the first data may include the processing result data of the first resource in the kth task processing process, the task processing operation may include a plurality of task processing tasks, and k may be an integer greater than or equal to 1.

In some embodiments, the first data may include the data obtained by the first resource processing the data received from the processing unit during the kth task processing process. For example, the first data may include gradient data calculated by each data processing resource in the first resource during the kth task processing process.

In some embodiments, task processing operations that require the help of clusters may include a plurality of task processing processes, and the data that needs to be processed in each task processing process may be obtained from the task processing. For example, in a distributed training task using the PS-Worker architecture, the processing unit may be a PS, and the Worker may include multiple data processing resources in the cluster. At this time, the Worker may pull weight data from the PS, and process the weight data to obtain the gradient data.

In some embodiments, the processing unit may be configured to obtain the processing result data of each data processing resource from the first resource based on the association information.

302, the task processing obtains second data through the N-n virtual resource identifiers based on the association information.

In some embodiments, the second data may include preset data.

In some embodiments, since the number n of data processing resources in the first resource may be less than N, during the execution of the task processing operation, n data processing resources may perform the kth task processing operation, and N-n virtual resource identifiers may not correspond to the actual available data processing resources. Therefore, the virtual resources corresponding to N-n virtual resource identifiers may send preset data to the target address, thereby improving the stability of the task processing operations.

In some embodiments, the preset data may be empty gradient data. The preset data may be adjusted based on the actual needs of the task processing operations, which is not limited in the embodiments of the present disclosure.

In some embodiments, the performance sequence of the processes at 301 and 302 may be adjusted, and these processes may also be performed in parallel, which is not limited in the embodiments of the present disclosure.

303, the processing unit processes the first data and the second data to obtain the k+1th processing data.

In some embodiments, the processing unit may process the first data and the second data based on the task processing requirement of the task processing operation. The task processing requirement may include at least one of the algorithm for processing the first data and the second data, the expected time of the task processing operation, the convergence requirement of the task processing operation, and the number and type of parameters associated with the task processing operation, which is not limited in the embodiments of the present disclosure.

Consistent with the present disclosure, after the processing unit obtains the first data through the n virtual resource identifiers based on the association information, the processing unit may also obtain the second data through the N-n virtual resource identifiers based on the association information, and process the first data and the second data to obtain the k+1th processing data.

Therefore, in the task processing method provided by the embodiments of the present disclosure, the processing unit can not only obtain eh data processing results of the first resource through N virtual resource identifiers, but obtain the preset data. That is, the processing unit can perform business processing operations with the help of a small amount of available data processing resources in the cluster through the N virtual resource identifiers. In addition, the combination of the preset data obtained from the N-n virtual resource identifiers can also improve the stability of the processing unit's management of business processing operations.

Based on the foregoing embodiments, in the task processing method provided by the embodiments of the present disclosure, the processing unit associating and controlling the first resource to perform the task processing operation through the N virtual resource identifiers based on the association information may include: the processing unit sending the k+1th processing data to the first resource through the n virtual resource identifiers based on the association information, such that the first resource can execute the k+1th task processing process based on the k+1th data.

In some embodiments, the k+1th processing data may include weight data to be processed in the k+1th task processing process obtained by processing the first data and the second data.

For example, the processing unit may send the k+1th processing data to be data processing resources in the cluster through the N virtual resource identifiers based on the association information. Since the actual available data processing resource is the first resource, the actual data processing resource receiving the k+1th data is the first resource.

Consistent with the present disclosure, the processing unit can send the k+1th processing data to the first resource through the N virtual resource identifiers based on the association information, such that the first resource can performed the k+1th task processing process based on the k+1th processing data. Therefore, the task processing method provided by the embodiments of the present disclosure can realize multiple task processing processes in the task processing operation through a small amount of available data processing resources in the cluster, thereby realizing a smooth closed-loop processing between the processing unit and a small amount of available data processing resources.

Based on the foregoing embodiments, in the task processing method provided by the embodiments of the present disclosure, the processing unit associating the second resource through N-n virtual resource identifiers may be realized by the processing unit switching the association information between the target virtual resource identifier and the third resource to the association information between the target virtual resource identifier and the second resource, and using the association information between the target virtual resource identifier and the second resource to associate the second resource.

In some embodiments, the target virtual resource identifier may include a virtual resource identifier having the same number of data processing resources as the second resource in the N-n virtual resource identifiers.

In some embodiments, the number of data processing resources p in the second resource may be an integer greater than or equal to 1 and less than or equal to N-n.

In some embodiments, when p is less than N-n, the corresponding p target virtual resource identifiers may be determined from the N-n virtual resource identifiers, and then the association between the p virtual resource identifiers and the third resource may be switched to the association between the p virtual resource identifiers and the second resource. In some embodiments, the association information corresponding to the N-n-p virtual resource identifiers may remain unchanged.

In some embodiments, when p equals to N-n, that is, when the number of data processing resources included in the second resource is N-n, and the number of target data processing resources is the same as the number of data processing resources in the second resource, at this time, the association information between the target virtual resource identifiers and the second resource after switching may include a one-to-one mapping relationship between the target virtual resource identifiers and the second resource.

Consistent with the present disclosure, after detecting the second resource, the processing unit can switch the association information between the target virtual resource identifier and the third resource to the association information between the target virtual resource and the second resource in real time, and associate the second resource through the association information between the target virtual resource identifier and the second resource.

Based on the foregoing embodiments, in the task processing method provided by the embodiments of the present disclosure, the processing unit controlling the first resource and the second resource to continue to perform the task processing operation through the N virtual resource identifiers may be realized through the following processes.

B1, transmitting third data obtained from the third resource to the second resource.

In some embodiments, the third data may include data corresponding to the third resource in the hth processing data obtained by the third resource from the processing unit, h being an integer greater than or equal to 1.

In some embodiments, the hth processing data output by the processing unit may include weight parameters that need to be processed by the data processing resources in the first resource during the hth task processing process.

In some embodiments, the weight parameters that each data processing resource in the first resource needs to process in the kth data processing process may be different. That is, the hth processing data may include multiple data components, and each data component may correspond to a different data processing resource in the first resource.

In some embodiments, since the target virtual resource identifier can be associated with the third resource before being associated with the second resource, the third data obtained by the third resource may be transmitted to the second resource. In this way, the sharing of to-be-processed data between the third resource and the second resource in the hth data processing process can be improved, and the stability of the hth data processing process can also be improved. In addition, after the second resource is switched to the second state, the second resource can immediately participate in the task processing process of the task processing operation, thereby improving the execution efficiency of the task processing operation.

B2, the processing unit controls the second resource based on the third data through the target virtual resource identifier and controls the first resource based on the hth processing data through the n virtual resource identifiers to perform the hth task processing process.

In some embodiments, the processing unit may control the second resource to start the task processing operation through the target virtual resource identifier, perform the hth task processing process based on the third data, and simultaneously control the first resource to perform the hth task processing process based on the hth processing data through the n virtual resource identifiers.

For example, the hth processing result may be obtained after the first resource and the second resource perform the hth task processing process, and the hth processing result may be returned to the processing unit through the target virtual resource identifier and n virtual resource identifiers, such that the processing unit can obtain the h+1th processing data based on the hth processing result. Subsequently, the processing unit may send the h+1th processing data to the second resource and the first resource through the target virtual resource identifier and the n virtual resource identifiers, thereby realizing the closed-loop execution of the task processing operation between the processing unit and the first resource and the second resource.

Consistent with the present disclosure, after detecting the second resource, after the second resource is switched to the second state and the second resource is associated with the target virtual resource identifier, when the second resource obtains the third data from the third resource, the processing unit can control the second resource through the target virtual resource identifier, and control the first resource through the n virtual resource identifiers to perform the hth task processing operation. In this way, the second resource can be dynamically added to the task processing 1 process of the task processing operation under the condition that the task processing process of the first resource does not need to be interrupted or suspended during the task processing process, thereby realizing the dynamic, flexible, and stable addition of data processing resources during the execution of the task processing operation, which greatly improves the execution efficiency of the task processing operation.

Figure 4:
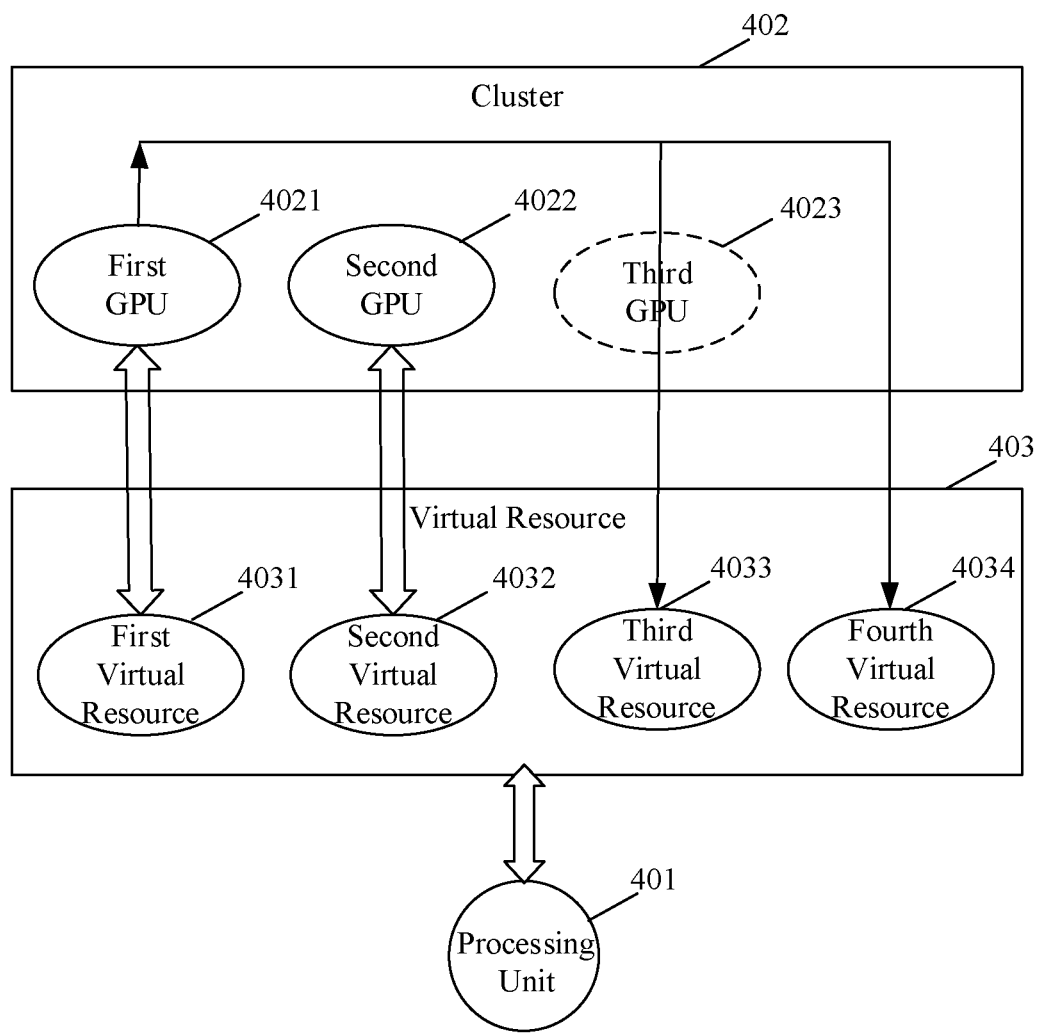
FIG. 4 is a schematic structural diagram of an implementation of the task processing method according to an embodiment of the present disclosure.

FIG. 4 is a schematic structural diagram of an implementation of the task processing method according to an embodiment of the present disclosure. As shown in FIG. 4, the processing unit 401 may be a PS in the PS-Worker, and the cluster 402 may include a plurality of Workers in the PS-Worker architecture. In some embodiments, the cluster 402 may include a plurality of data processing resources. In some embodiments, the data processing resources in the cluster 402 may include GPUs. In FIG. 4, the cluster 402 includes a plurality of GPUs.

In some embodiments, when the processing unit 401 receives a task processing instruction, the GPUs in the first state in the cluster 402 may include a first GPU 4021 and a second GPU 4022.

For example, the processing unit 401 may analyze the task processing instruction and determine that the number of data processing resources required for the task processing operation corresponding to the task processing instruction is 4. At this time, the processing unit 401 may create a virtual resource 403 based on the amount of data processing resources required for the task processing operation. The virtual resource 403 may include a first virtual resource 4031, a second virtual resource 4032, a third virtual resource 4033, and a fourth virtual resource 4034. In addition, the processing unit 401 may set the virtual resource identifiers, that is, the address information of the virtual resources, that is, the second address information, for the first virtual resource 4031, the second virtual resource 4032, the third virtual resource 4033, and the fourth virtual resource 4034.

In some embodiments, the number of GPUs in the first state in the cluster 402 may be less than the number of GPUs required for the task processing operation. Therefore, the processing unit 401 may obtain the address information, that is, the first address information, of the first GPU 4021 and the second GPU 4022, and the address information of the first virtual resource 4031 to the fourth virtual resource 4034, that is, the second address information, through its communication connection with the cluster 402. In addition, the processing unit 401 may determine the association information between the first address information and the second address information based on the number of GPUs in the first state and the number of virtual resources 403. That is, the address of the first virtual resource 4031 may be associated with the address of the first GPU 4021, the address of the second virtual resource 4032 may be associated with the second GPU 4022, and the address of the third virtual resource 4033 and the address of the fourth virtual resource 4034 may be associated with the address of the first GPU 4021.

In some embodiments, after the processing unit 401 determines the association information, the processing unit 401 may control the first GPU 4021 through the address of the first virtual resource 4031 and the second GPU 4022 through the address of the second virtual resource 4032 to perform the task processing operation based on the association information. In this way, even if the number of GPUs in the first state in the cluster 402 cannot meet the requirements of the task processing operation, the task processing operation can also be started and performed.

In some embodiments, the processing unit 401 may send the kth processing data to the first virtual resource 4031 to the fourth virtual resource 4034 respectively based on the association information. After the first virtual resource 4031 obtains the data corresponding to the first GPU 4021 in the kth processing data, the first virtual resource 4031 may send the data to the first GPU 4021, and after the second virtual resource 4032 obtains the data corresponding to the second GPU 4022 in the kth processing data, the second virtual resource 4032 may send the data to the second GPU 4022. In this way, the kth task processing process can be performed through the first GPU 4021 and the second GPU 4022. After the kth task processing process ends, the first GPU 4021 and the second GPU 4022 may respectively send the processing result data to the processing unit 401 through the first virtual resource 4031 and the second virtual resource 4032, while the third virtual resource 4033 and the fourth virtual resource 4034 may send the preset data, such as empty gradient data, to the processing unit 401. In some embodiments, after receiving the processing result data and the empty gradient data, the processing unit 401 may process these data to obtain the k+1th processing data, and send the k+1th processing data to the first GPU 4021 and the second GPU 4022 through the first virtual resource 4031 and the second virtual resource 4032 respectively based on the association relationship.

In some embodiments, if it is detected in the cluster 402 that the third GPU 4023 is switched to the first state, the association information between the address of the third virtual resource 4033 and the address of the first GPU 4021 may be switched to the association information between the address of the third virtual resource 4033 and the address of the third GPU 4023, and send the data corresponding to the first GPU 4021 in the k+1th processing data received by the first GPU 4021 to the third GPU 4023. At this time, the processing unit 401 may respectively control the first GPU 4021 to the third GPU 4023 to perform the k+1th task processing process through the first virtual resource 4031 to the third virtual resource 4033 based on the association information.

In some embodiments, since the number of GPUs in the first state in the cluster 402 may be less than the number of virtual resources 403, the address of the fourth virtual resource 4034 may still be associated with the address of the first GPU 4021. For example, after detecting that a GPU in the cluster 402 is switched to the first state, through the method provided in the foregoing embodiments, the processing unit 401 may associate the address information of the fourth virtual resource 4034 with the address of the GPU switched to the first state, and control the GPU and the first GPU 4021 to the third GPU 4023 to continue to perform the task processing operation through the association information.

Consistent with the present disclosure, under the condition that the number of GPUs in the first state in in the cluster 402 cannot fully meet the task processing operation, the dynamic execution of the task processing operation can be realized. In addition, during the execution of the task processing operation, without affecting the normal operation of the GPU already in the running state, a GPU switched to the first state in the cluster 402 can be dynamically, flexibly, and in real time, added to the task processing process, thereby increasing the flexibility and efficiency of task processing operation.

Figure 5:
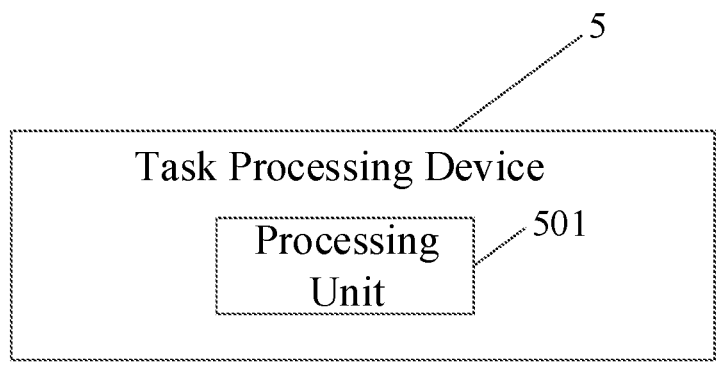
FIG. 5 is a schematic structural diagram of a task processing device according to an embodiment of the present disclosure.

Based on the foregoing embodiments, an embodiment of the present disclosure also provides a task processing device. FIG. 5 is a schematic structural diagram of a task processing device 5 according to an embodiment of the present disclosure. As shown in FIG. 5, the task processing device 5 includes a processor 501. The processor 501 may be configured to associate and control the first resource to perform the corresponding task processing operation through N virtual resource identifiers in response to a task processing instruction, N being the number of data processing resources required for the task processing operation. In some embodiments, the first resource may include n data processing resources in the first state in the cluster, n being an integer greater than or equal to 1 and n<N.

In some embodiments, the processor 501 may be further configured to associate the first resource with N−n virtual resource identifiers when the second resource is switched from the second state to the first state, the second resource including at least one data processing resource in the cluster other than the first resource.

In some embodiments, the processor 501 may be further configured to control the first resource and the second resource to continue to perform the task processing operation through the N virtual resource identifiers.

In some embodiments, the processor 501 may be configured to obtain the association information, the association information including mapping information between the N virtual resource identifiers and the data processing resources.

In some embodiments, the processor 501 may be configured to associate n virtual resource identifiers with the first resource and associate N−n virtual resource identifiers with the third resource based on the association information, the third resource including any data processing resource in the first resource.

In some embodiments, the processor 501 may be configured to associate and control the first resource to perform the task processing operation through the N virtual resource identifiers based on the association information.

In some embodiments, the processor 501 may be configured to obtain the first data through n virtual resource identifiers based on the association information. The first data may include the processing result data of the first resource in the kth task processing process. The task processing operation may include a plurality of task processing processes, and k may be an integer greater than or equal to 1.

In some embodiments, the processor 501 may be further configured to obtain the second data through N−n virtual resource identifiers based on the association information, the second data including preset data.

In some embodiments, the processor 501 may be configured to process the first data and the second data to obtain the k+1th processing data.

In some embodiments, the processor 501 may be configured to send the k+1th processing data to the first resource through n virtual resource identifiers based on the association information, such that the first resource can perform the k+1th task processing process based on the k+1th processing data.

In some embodiments, the processor 501 may be configured to switch the association information between the target virtual resource identifier and the third resource to the association information between the target virtual resource identifier and the second resource, and associate the second resource with through the association information between the target virtual resource identifier and the second resource. The target virtual resource identifier may include a virtual resource identifier having the same number of data processing resources as the second resource in the N−n virtual resource identifiers.

In some embodiments, the processor 501 may be configured to transmit the third data obtained from the third resource to the second resource. The third data may include data corresponding to the third resource in the hth processing data obtained by the third resource from the processing unit, h being an integer greater than or equal to 1.

In some embodiments, the processor 501 may be further configured to control the second resource based on the third data through the target virtual resource identifier, and control the first resource based on the hth processing data through the n virtual resource identifiers to perform the hth task processing process.

In some embodiments, the processor 501 may be configured to obtain the first address information and the second address information, and obtain the association information based on the first address information and the second address information. In some embodiments, the first address information may include address information of the data processing resources, and the second address information may include N virtual resource identifiers.

In some embodiments, the processor 501 may be configured to create N virtual resources based on the task processing instruction, and set the virtual resource identifiers for the N virtual resources to obtain the N virtual resource identifiers.

In some embodiments, the processor 501 may be configured to adjust the state of the first resource to the second state after associating and controlling the first resource to perform the task processing operation through the N virtual resource identifiers, and adjust the state of the second resource to the second state after the processing unit controls the first resource through the N virtual resource identifiers and the second resource to continue to perform the task processing operation.

In some embodiments, the processor 501 may be implemented by a processor of an electronic device, and the processor may be at least one of ASIC, DSP, DSPD, PLD, FPGA, CPU, controller, microcontroller, and microprocessor.

According to the embodiments of the task processing device provided in the present disclosure, when the number of data processing resources in the first state in the cluster is less than the number of data processing resources required by the task processing operation, the task processing operation can still be performed. In addition, when at least one data processing resource in the cluster switches to the first state, the available data processing resource may be dynamically and flexibly associated with the task processing operation to continue to perform the task processing operation. In this way, the task processing operation can be performed flexibly when the number of available data processing resources cannot meet the requirements of the task processing operation, and the dynamic addition of data processing resources during the task processing operation process is improved, thereby greatly improving the flexibility of task processing operation based on the cluster and improving the efficiency of the task processing operation.

Based on the foregoing embodiments, an embodiment of the present disclosure also provides a computer-readable storage medium. The storage medium stores a computer program that, when being executed by a processor of an electronic device, causes the processor to perform the processes of the task processing method provided in any of the foregoing embodiments.

The above description of the various embodiments tends to emphasize the differences between the various embodiments, and the same or similarities may be referred to each other. For the brevity, the details are not repeated herein.

The methods described in each method embodiments provided in the present disclosure may be combined arbitrarily without conflict to obtain new method embodiments.

The features described in the product embodiments provided in the present disclosure may be combined arbitrarily without conflict to obtain new product embodiments.

The features described in each method or device embodiment provided in the disclosure may be combined arbitrarily without conflict to obtain a new method embodiment or device embodiment.

In some embodiments, the above-described computer-readable storage medium may include a read-only memory (ROM), a programmable read-only memory (PROM), an erasable programmable read-only memory (EPROM), an electrically erasable programmable read-only memory (EEPROM), a ferromagnetic random-access memory (FRAM), a flash memory, a magnetic surface memory, a CD, or a compact disc read-only memory (CD-ROM), etc. The above computer-readable storage medium may further include a variety of electronic apparatuses including one or any combination of the above-described memories, such as mobile phones, computers, tablet devices, and personal digital assistants, etc.

In some embodiments, the terms "include", "contain" or any other variants thereof are intended to cover non-exclusive inclusion, such that a process, a method, an article or a device including a series of elements not only includes those elements, but also includes other elements not explicitly listed, or elements inherent to the process, the method, the article, or the device. Without more restrictions, the element defined by the sentence "including a . . . " does not exclude the existence of other identical elements in the process, the method, the article, or the device that includes the element.

The numbers of the above embodiments of the present disclosure are for description only and do not represent the advantages and disadvantages of the embodiments.

Through the description of the above embodiments, those skilled in the art may clearly understand that the method of the above embodiments may be implemented by means of software plus necessary general hardware nodes. The method may also be implemented by hardware, but in many cases, the former is a better implementation manner. The technical solution of this application essentially or the part that contributes to the existing technology can be embodied in the form of a software product, and the computer software product stored in a storage medium (such as ROM/RAM, magnetic disk, optical disc) includes several instructions to enable a terminal device (such as the mobile phone, the computer, the server, an air conditioner, or a network device, etc.) to execute the methods described in the various embodiments of the present disclosure.

Embodiments of the present disclosure are described regarding flowcharts and/or block diagrams of methods, devices (systems), and computer program products. In some embodiment, each process and/or block of the flowchart and/or block diagram, and the combination of processes and/or blocks in the flowchart and/or block diagram may be implemented by computer program instructions. The computer program instruction is provided to the processor of a general-purpose computer, a special-purpose computer, an embedded processor, or other programmable data processing equipment to produce a machine, so that the instructions executed by the processor of the computer or other programmable data processing equipment are configured for implementing the functions specified in one flow or a plurality of flows in the flowchart and/or one block or multiple blocks in the block diagram.

The computer program instructions may also be stored in a computer-readable memory that can direct a computer or other programmable data processing equipment to work in a specific manner so that the instructions stored in the computer-readable memory produce an article of manufacture including the instruction device. The device implements the functions specified in one process or multiple processes in the flowchart and/or one block or multiple blocks in the block diagram.

These computer program instructions may also be loaded on a computer or other programmable data processing equipment, so that a series of operation processes are executed on the computer or other programmable equipment to produce computer-implemented processing, so as to execute on the computer or other programmable equipment. The instructions provide steps for implementing the functions specified in one process or multiple processes in the flowchart and/or one block or multiple blocks in the block diagram.

The above are only preferred embodiments of the present disclosure and do not limit the scope of this application. Any equivalent structure or equivalent process transformation made using the content of the description and drawings of the disclosure, or directly or indirectly used in other related technical fields are also included in the scope of patent protection of the present disclosure.

What is claimed is:

1. A task processing method comprising:
    associating and controlling, by a processing unit, a first resource to perform a task processing operation through N virtual resource identifiers in response to a task processing instruction, N being a number of data processing resources required for the task processing operation, the first resource including n data processing resources, n being an integer greater than or equal to 1, n<N;
    associating, by the processing unit, a second resource with N−n virtual resource identifiers when the second resource switches from a second state to a first state, the second resource including at least one data processing resource in a cluster other than the first resource; and
    controlling, by the processing unit, the first resource and the second resource to continue to perform the task processing operation through the N virtual resource identifiers.

2. The task processing method of claim 1, wherein the processing unit associating and controlling the first resource to perform the task processing operation through the N virtual resource identifiers includes:
obtaining, by the processing unit, association information, the association information including mapping information between the N virtual resource identifiers and the data processing resources;
associating, by the processing unit, the n virtual resource identifiers with the first resource based on the association information, and the N−n virtual resource identifiers with a third resource, the third resource including any data processing resource of the first resource; and
associating and controlling, by the processing unit, the first resource to perform the task processing operation through the N virtual resource identifiers based on the association information.

3. The task processing method of claim 2, wherein the processing unit associating and controlling the first resource to perform the task processing operation through the N virtual resource identifiers based on the association information includes:
obtaining, by the processing unit, first data based on the association information through the n virtual resource identifiers, the first data including processing result data of the first resource during kth task processing process, the task processing operation including a plurality of task processing processes, k being an integer greater than or equal to 1;
obtaining, by the processing unit, second data through the N−n virtual resource identifiers based on the association information, the second data including preset data; and
processing, by the processing unit, the first data and the second data to obtain k+1th processing data.

4. The task processing method of claim 3 further comprising:
sending, by the processing unit, the k+1th processing data to the first resource through the n virtual resource identifiers based on the association information for the first resource to perform k+1th processing process based on the k+1th processing data.

5. The task processing method of claim 2, wherein the processing unit associating the second resource through the N−n virtual resource identifiers includes:
switching, by the processing unit, the association information between a target virtual resource identifier and the third resource to the association information between the target virtual resource identifier and the second resource; and
associating, by the processing unit, the second resource through the association information between the target virtual resource identifier and the second resource, the target virtual resource identifier including a virtual resource identifier having the same number of data processing resources in the second resource in the N−n virtual resource identifiers.

6. The task processing method of claim 5, wherein the processing unit controlling the first resource and the second resource to continue to perform the task processing operation through the N virtual resource identifiers includes:
transmitting, by the processing unit, third data obtained from the third resource to the second resource, the third data including data corresponding to the third resource in hth processing data obtained by the third resource from the processing unit, h being an integer greater than or equal to 1; and
controlling, by the processing unit, the second resource through the target virtual resource identifier based on the third data, and the first resource through the n virtual resource identifiers based on the hth processing data to perform hth task processing process.

7. The task processing method of claim 2, wherein obtaining the association information includes:
obtaining, by the processing unit, first address information and second address information, the first address information including address information of the data processing resources, the second address information including the N virtual resource identifiers; and
obtaining, by the processing unit, the association information based on the first address information and the second address information.

8. The task processing method of claim 1 further comprising:
creating, by the processing unit, N virtual resources based on the task processing instruction; and
setting, by the processing unit, the virtual resource identifiers for the N virtual resources to obtain the N virtual resource identifiers.

9. The task processing method of claim 1 further comprising:
adjusting a state of the first resource to the second state after the processing unit associates and controls the first resource to perform the task processing operation through the N virtual resource identifiers; and
adjusting a state of the second resource to the second state after the processing unit control the first resource and the second resource through the N virtual resource identifiers to continue to perform the task processing operation.

10. A task processing device comprising:
a processing unit, the processing unit being configured to:
control and associate a first resource to perform a corresponding task processing operation through N virtual resource identifiers in response to a task processing instruction, N being a number of data processing resources required for the task processing operation, the first resource including n data processing resources, n being an integer greater than or equal to 1, n<N;
associate a second resource with N−n virtual resource identifiers when the second resource switches from a second state to a first state, the second resource including at least one data processing resource in a cluster other than the first resource; and
control the first resource and the second resource to continue to perform the task processing operation through the N virtual resource identifiers.

11. The task processing device of claim 10, wherein the processing unit is further configured to:
obtain association information, the association information including mapping information between the N virtual resource identifiers and the data processing resources;
associate the n virtual resource identifiers with the first resource based on the association information, and the N−n virtual resource identifiers with a third resource, the third resource including any data processing resource of the first resource; and
associate and control the first resource to perform the task processing operation through the N virtual resource identifiers based on the association information.

12. The task processing device of claim 11, wherein the processing unit is further configured to:

obtain first data based on the association information through the n virtual resource identifiers, the first data including processing result data of the first resource during kth task processing process, the task processing operation including a plurality of task processing processes, k being an integer greater than or equal to 1;

obtain second data through the N−n virtual resource identifiers based on the association information, the second data including preset data; and process the first data and the second data to obtain k+1th processing data.

13. The task processing device of claim 12, wherein the processing unit is further configured to:

send the k+1th processing data to the first resource through the n virtual resource identifiers based on the association information for the first resource to perform k+1th processing process based on the k+1th processing data.

14. The task processing device of claim 11, wherein the processing unit is further configured to:

switch the association information between a target virtual resource identifier and the third resource to the association information between the target virtual resource identifier and the second resource; and associate the second resource through the association information between the target virtual resource identifier and the second resource, the target virtual resource identifier including a virtual resource identifier having the same number of data processing resources in the second resource in the N−n virtual resource identifiers.

15. The task processing device of claim 14, wherein the processing unit is further configured to:

transmit third data obtained from the third resource to the second resource, the third data including data corresponding to the third resource in hth processing data obtained by the third resource from the processing unit, h being an integer greater than or equal to 1; and control the second resource through the target virtual resource identifier based on the third data and the first resource through the n virtual resource identifiers based on the hth processing data to perform hth task processing process.

16. The task processing device of claim 11, wherein the processing unit is further configured to:

obtain first address information and second address information, the first address information including address information of the data processing resources, the second address information including the N virtual resource identifiers; and obtain the association information based on the first address information and the second address information.

17. The task processing device of claim 10, wherein the processing unit is further configured to:

create virtual resources based on the task processing instruction; and set the virtual resource identifiers for the N virtual resources to obtain the N virtual resource identifiers.

18. The task processing device of claim 10, wherein the processing unit is further configured to:

adjust a state of the first resource to the second state after the processing unit associates and controls the first resource to perform the task processing operation through the N virtual resource identifiers; and adjust a state of the second resource to the second state after the processing unit control the first resource and the second resource through the N virtual resource identifiers to continue to perform the task processing operation.

19. A non-transitory computer-readable storage medium containing computer-executable instructions that, when executed by a processor, cause the processor to:

control and associate a first resource to perform a corresponding task processing operation through N virtual resource identifiers in response to a task processing instruction, N being a number of data processing resources required for the task processing operation, the first resource including n data processing resources, n being an integer greater than or equal to 1, n<N;

associate a second resource with N−n virtual resource identifiers when the second resource switches from a second state to a first state, the second resource including at least one data processing resource in a cluster other than the first resource; and control the first resource and the second resource to continue to perform the task processing operation through the N virtual resource identifiers.

20. The non-transitory computer-readable storage medium of claim 19, wherein the computer-executable instructions further cause the processors to:

obtain association information, the association information including mapping information between the N virtual resource identifiers and the data processing resources;

associate the n virtual resource identifiers with the first resource based on the association information, and the N−n virtual resource identifiers with a third resource, the third resource including any data processing resource of the first resource; and associate and control the first resource to perform the task processing operation through the N virtual resource identifiers based on the association information.

* * * * *